(12) United States Patent
Gans

(10) Patent No.: US 9,419,330 B1
(45) Date of Patent: Aug. 16, 2016

(54) SYSTEM FOR AIRBORNE COMMUNICATIONS

(71) Applicant: GOVERNMENT OF THE UNITED STATES AS REPRESENTED BY THE SECRETARY OF THE AIR FORCE, Washington, DC (US)

(72) Inventor: Michael J. Gans, Holland Patent, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 141 days.

(21) Appl. No.: 14/643,212

(22) Filed: Mar. 10, 2015

(51) Int. Cl.
*H04L 5/16* (2006.01)
*H01Q 1/28* (2006.01)
*H04B 7/04* (2006.01)
*H04B 7/15* (2006.01)

(52) U.S. Cl.
CPC ............. *H01Q 1/286* (2013.01); *H04B 7/0456* (2013.01); *H04B 7/15* (2013.01)

(58) Field of Classification Search
CPC .......... H04B 3/36; H04L 25/20; H04L 12/44
USPC ................. 375/211, 219, 267, 299, 347, 349; 342/253; 343/797, 810, 821
See application file for complete search history.

(56) References Cited

U.S. PATENT DOCUMENTS

| | | | |
|---|---|---|---|
| 2008/0258876 A1* | 10/2008 | Overhultz .......... | G06K 7/10336 340/10.2 |
| 2012/0202430 A1* | 8/2012 | Jalali .................... | H01Q 1/2291 455/63.1 |
| 2014/0219124 A1* | 8/2014 | Chang .................. | H04B 7/0626 370/252 |
| 2015/0214634 A1* | 7/2015 | Lee ........................ | H01Q 9/065 343/797 |

* cited by examiner

*Primary Examiner* — Khai Tran
(74) *Attorney, Agent, or Firm* — Joseph A. Mancini

(57) ABSTRACT

The invention achieves high Multiple Input, Multiple Output (MIMO) data rates over long wireless links by employing large ground relay MIMO antenna arrays and conformal airborne MIMO antenna arrays. Antenna transceiving element layouts and polarizations are optimized for enhanced channel capacity.

6 Claims, 8 Drawing Sheets

SYSTEM FOR AIRBORNE COMMUNICATIONS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to enabling aircraft wireless links to achieve the high data rates provided by MIMO (Multiple Input-Multiple Output) communications over longer distances than usually provided with limited size aircrafts. The invention described herein employs a large size ground array MIMO relay.

The wireless link between aircraft at elevated altitudes is typically free of electromagnetic reflections (termed free-space communications). MIMO links rely on the ability to distinguish between the transmitting array elements by the receiving array. Without electromagnetic scattering, the transmitting array element spacing must be resolved by the receiving array free-space beamwidth. The beamwidth of the receiving array is limited by its size, which is limited by the size of the aircraft. For typical size aircraft and typical radio frequencies, link distances greater than 1 km do not provide the MIMO data rates expected for spectrum efficiency. It is desirable to provide MIMO capacity for aircraft links longer than 100 km. A way of overcoming the limitations imposed by aircraft size is desired.

The distance limitation for a wireless aircraft to aircraft MIMO link is highlighted in the reference, M. J. Gans, "Aircraft Free-Space MIMO Communications", *Asilomar Conference on Signals and Computers*, Nov. 1-4, 2009—Paper MP7a-1.

FIG. 1 shows the channel capacity as a function of distance and frequency for two example F-35 airplanes for two arrays with 12 elements each. The graph shows for 10 GHz, the dependence of channel capacity on longitudinal separation for the twelve element array case with 100 m lateral and height separations of the parallel flight paths. Note that the lateral and height separations prevent the airplanes from approaching nearer than 140 meters. The channel capacity actually exceeds the ergodic Rayleigh capacity mostly out to a longitudinal separation of 700 m. The rapid decrease in channel capacity for link lengths greater than 1 km is due to the insufficient resolving power of the array because of the limited aircraft size.

One method of increasing the possible communications link length using MIMO on a fixed aircraft size is to increase the radio frequency. The beamwidth of a fixed width array is inversely proportional to the radio frequency. A much narrower beamwidth can allow transmitting antenna element resolution by the receiving array at larger distances. However, using a many times higher frequency can be subject to high propagation loss and expensive hardware.

In U.S. Pat. No. 6,097,771 to G. J. Foschini, "Wireless Communications System Having a Layered Space-Time Architecture Employing Multi-Element Antennas" it is taught that wireless link data rates can be increased roughly in proportion to the number of antenna elements at the link terminals, without increasing the total transmitted power or bandwidth. This allows for enormous data rates, e.g., hundreds of bits per second per Hz for a system employing 30 antennas at both transmitter and receiver and experiencing an average signal-to-noise ratio of 24 dB in a so-called Rayleigh fading environment. This is the high data rate MIMO capacity sought after in the free-space aircraft environment, referred to above.

OBJECTS AND SUMMARY OF THE INVENTION

It is therefore an object of the present invention to provide maximized channel capacity in communications with airborne platforms.

It is a further object of the present invention to provide a ground array relay to overcome the prior art's link length capacity limitation of aircraft to aircraft communications.

It is a further object of the present invention to provide antenna array layouts which provide coverage flexibility and compactness, while maintaining high MIMO data rate capacity.

Briefly stated, the present invention achieves high Multiple Input, Multiple Output (MIMO) data rates over long wireless links by employing large ground relay MIMO antenna arrays and conformal airborne MIMO antenna arrays. Antenna transceiving element layouts and polarizations are optimized for enhanced channel capacity.

According to an embodiment of the present invention, a system for airborne communications, comprises a ground-based multiple-input, multiple-output antenna; and at least one aircraft based multiple-input, multiple-output antenna where the ground-based multiple-input, multiple-output antenna further comprises a first plurality of transceiving elements and where the first plurality of transceiving elements are arranged in a plurality of concentric rings so as to provide any concentric ring a collective polarization coverage range of 0 degrees to 360 degrees; and where the aircraft based multiple-input, multiple-output antenna further comprises a second plurality of transceiving elements and where the second plurality of transceiving elements are arranged on an airframe of an aircraft so as to provide the second plurality of transceiving elements a collective polarization coverage range of 0 degrees to 360 degrees.

According to another embodiment of the present invention, a system for airborne communications relay, comprises a ground-based multiple-input, multiple-output antenna and at least two aircraft each having an aircraft-based multiple-input, multiple-output antenna, where the ground-based multiple-input, multiple-output antenna further comprises a first plurality of transceiving elements where the first plurality of transceiving elements are arranged in a plurality of concentric rings so as to provide any concentric ring a collective polarization coverage range of 0 degrees to 360 degrees; and where each aircraft based multiple-input, multiple-output antenna further comprises a second plurality of transceiving elements where the second plurality of transceiving elements are arranged on an airframe of an aircraft so as to provide the second plurality of transceiving elements a collective polarization coverage range of 0 degrees to 360 degree and where communications is relayed from the aircraft based multiple-input, multiple-output antenna of one of the at least two aircraft, through the ground-based multiple-input, multiple-output antenna to the aircraft based multiple-input, multiple-output antenna of one or more of the other at least two aircraft.

INCORPORATED BY REFERENCE

[1] Patent Number [11]: U.S. Pat. No. 6,097,771 Foschini [45] Date of Patent: Aug. 1, 2000 "Wireless Communications. System Having a Layered Space-Time Architecture Employing Multi-Element Antennas" Inventor: Gerard Joseph Foschini, South Amboy, N.J. Assignee: Lucent Technologies Inc., Murray Hill, N.J. application Ser. No. 08/673,981 Filed: Jul. 1, 1996

[2]. M, J. Gans, "Aircraft Free-Space MIMO Communications", *Asilomar Conference on Signals and Computers*, Paper MP7a-1, Nov. 1-4, 2009.

[3]. R. F. Harrington, "Time Harmonic Electromagnetic Fields" McGraw-Hill Book Company, Inc., New York, N.Y., 1961, p. 79 Eq. (2-113).

BRIEF DESCRIPTION OF THE DRAWINGS

For simplicity, the effects of antenna layout choices are illustrated using the example of dipole antennas as transceiving elements. If other antenna elements are used than dipoles, the strategies developed with the dipole antenna arrays are still instructive and provide a performance estimate.

DETAILED DESCRIPTION OF THE PREFERRED EMBODIMENT

By employing an earth based relay of size much larger than the aircraft, the ground MIMO array of the present invention can resolve the aircraft array elements and the aircraft array can resolve the widely spaced elements on the ground array. Thus the link from aircraft to ground array can provide high MIMO capacity for much larger link lengths than that provided by aircraft to aircraft links. By using the large ground array as a relay, high MIMO capacity can be provided from aircraft A to the ground array to aircraft B, even though the distance from aircraft A to aircraft B is on the order of 200 km.

An important aspect of the layout of the MIMO antenna elements in the aircraft and the ground arrays is the choice of their polarizations, locations, and orientations. Choices which maximize the channel capacity and coverage should be selected. By considering all likely scenarios of aircraft attitudes and locations better strategies for antenna layout are determined.

Figure 1:
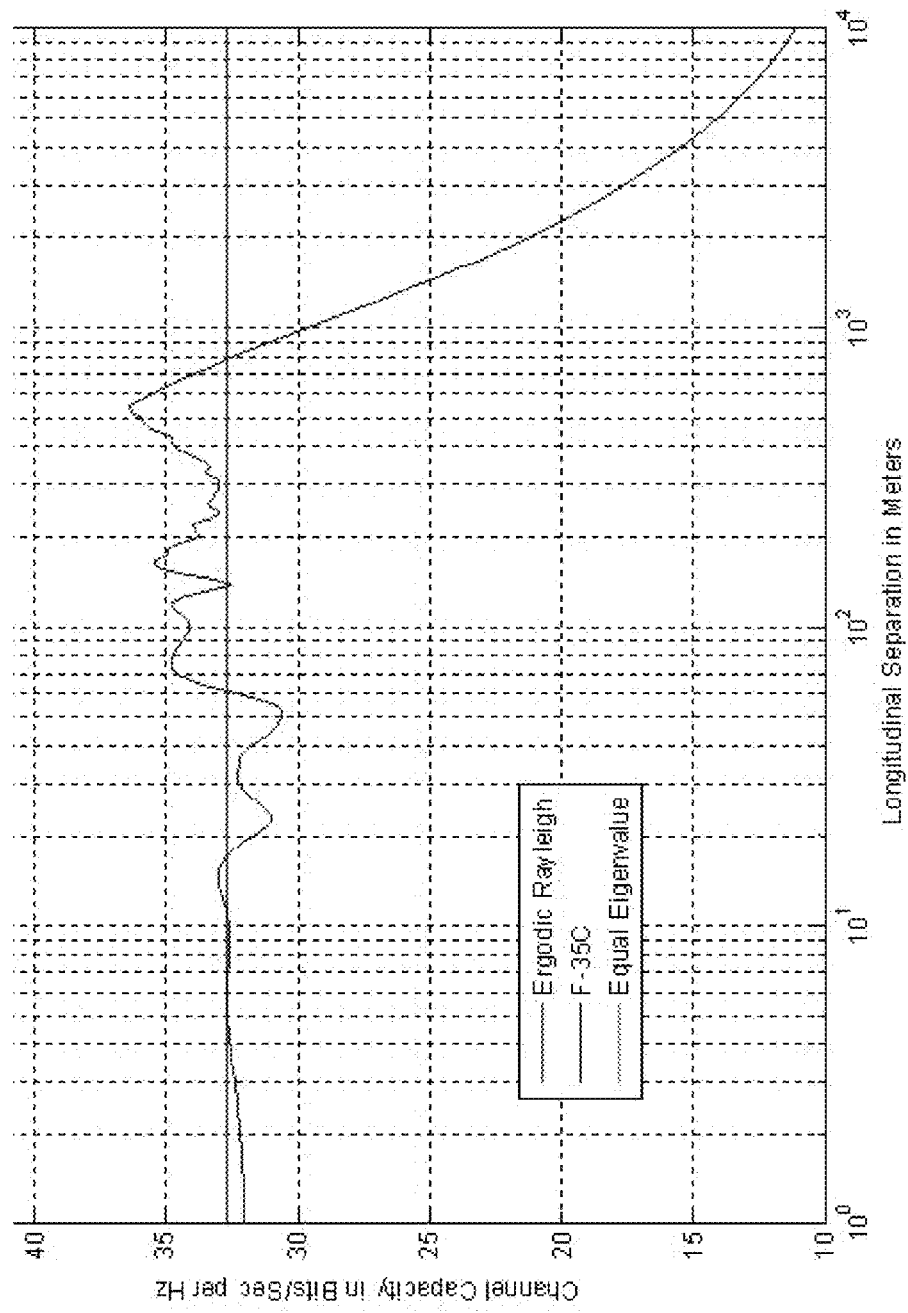
FIG. 1 depicts theoretical channel capacity versus separation of transmitter and receiver in a Rayleigh fading environment.
Figure 2:
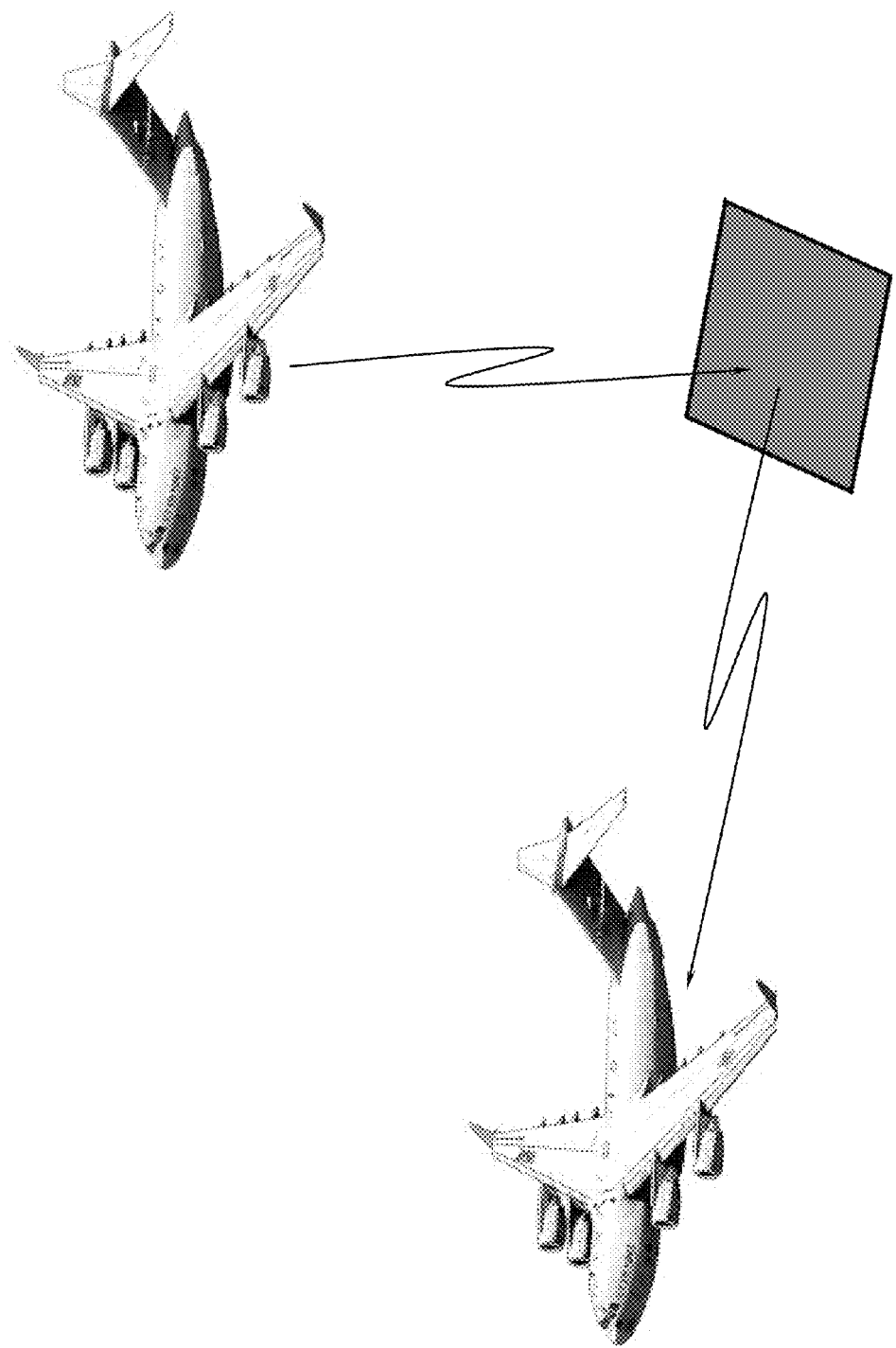
FIG. 2 depicts aircraft-to-aircraft communications through a ground-based MIMO relay antenna.

Referring to FIG. 2 is a depiction of a typical application of a ground array relay. A MIMO array on an aircraft transmits to a large area ground based MIMO array relay. The ground based MIMO array then relays its received data through a MIMO link to another aircraft.

Figure 3:
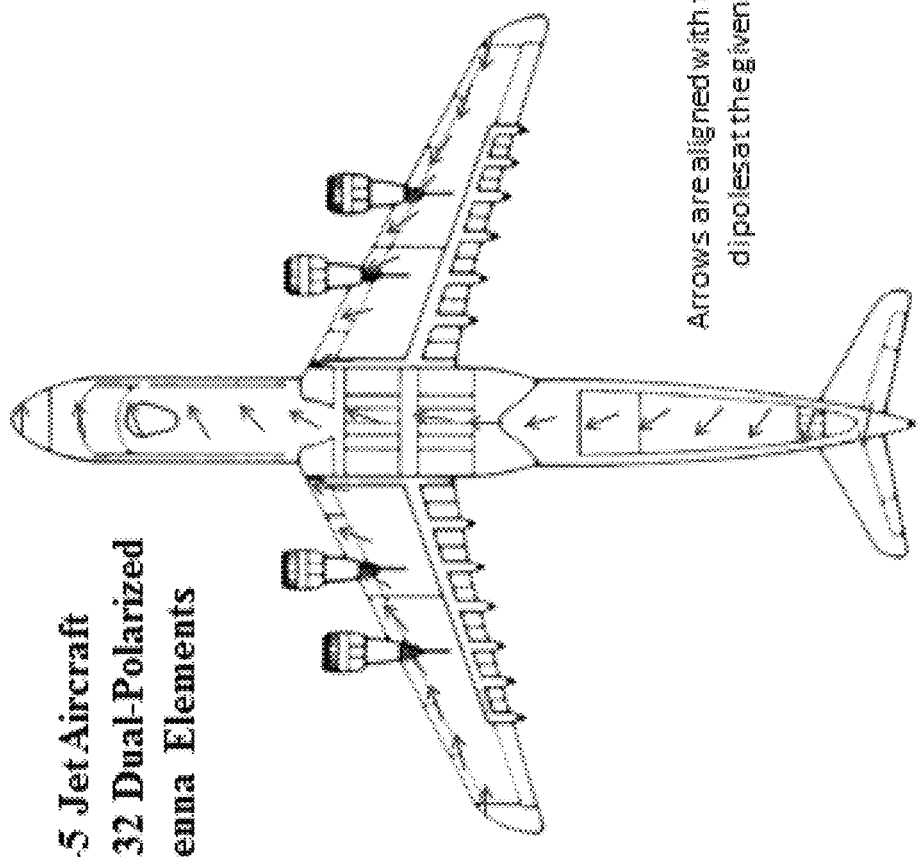
FIG. 3 depicts a MIMO antenna layout on a C-5 aircraft.

Referring to FIG. 3 is a typical layout of transceiving antenna elements on a C-5 aircraft. At each antenna location, a dual polarization patch antenna element is mounted, a dipole moment parallel with the surface of the aircraft (termed horizontal) and one perpendicular to the aircraft surface (termed vertical). Only the horizontal dipole is shown. The array represents a 64 element MIMO array. The antenna layout uses many polarizations and wide spacing to assist resolution of antenna elements for MIMO communication.

Figure 4:
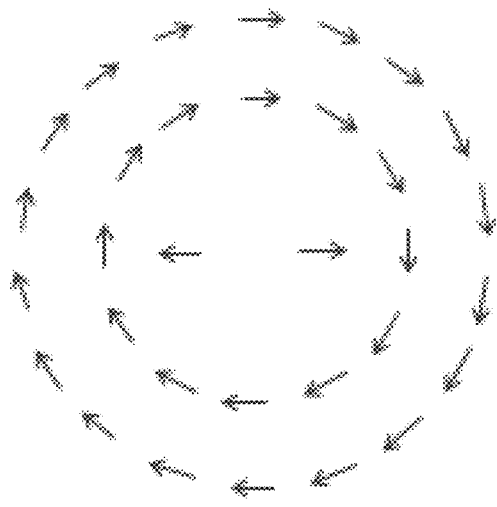
FIG. 4 depicts a typical layout of antenna elements on 1 km diameter ground array.

Referring to FIG. 4 is a typical layout of antenna elements on 1 km diameter ground array. At each antenna location, a dual polarized dipole antenna element is mounted, a dipole parallel with the surface of the earth (termed horizontal) and one perpendicular to the earth (termed vertical). Only the horizontal dipole is shown. The array represents a 64 element MIMO array. The antenna layout uses many polarizations and wide spacing to assist resolution of antenna elements for MIMO communication.

Figure 5:
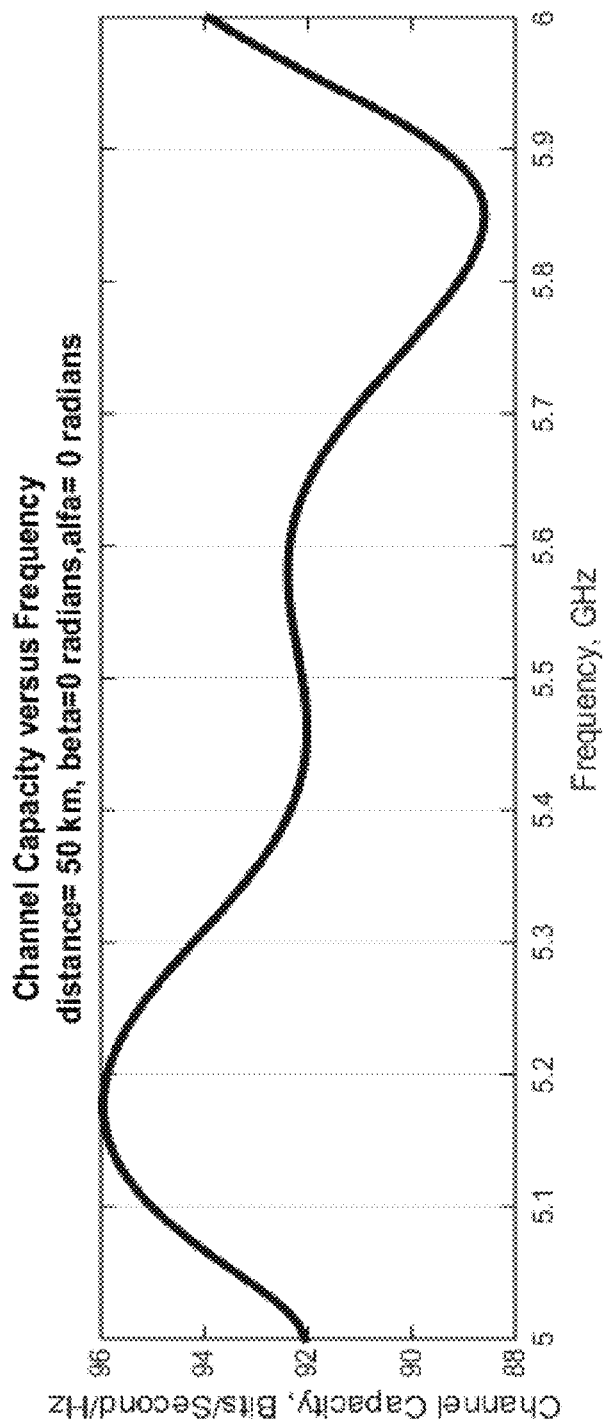
FIG. 5 depicts channel capacity versus frequency for a 50 km range.
Figure 6:
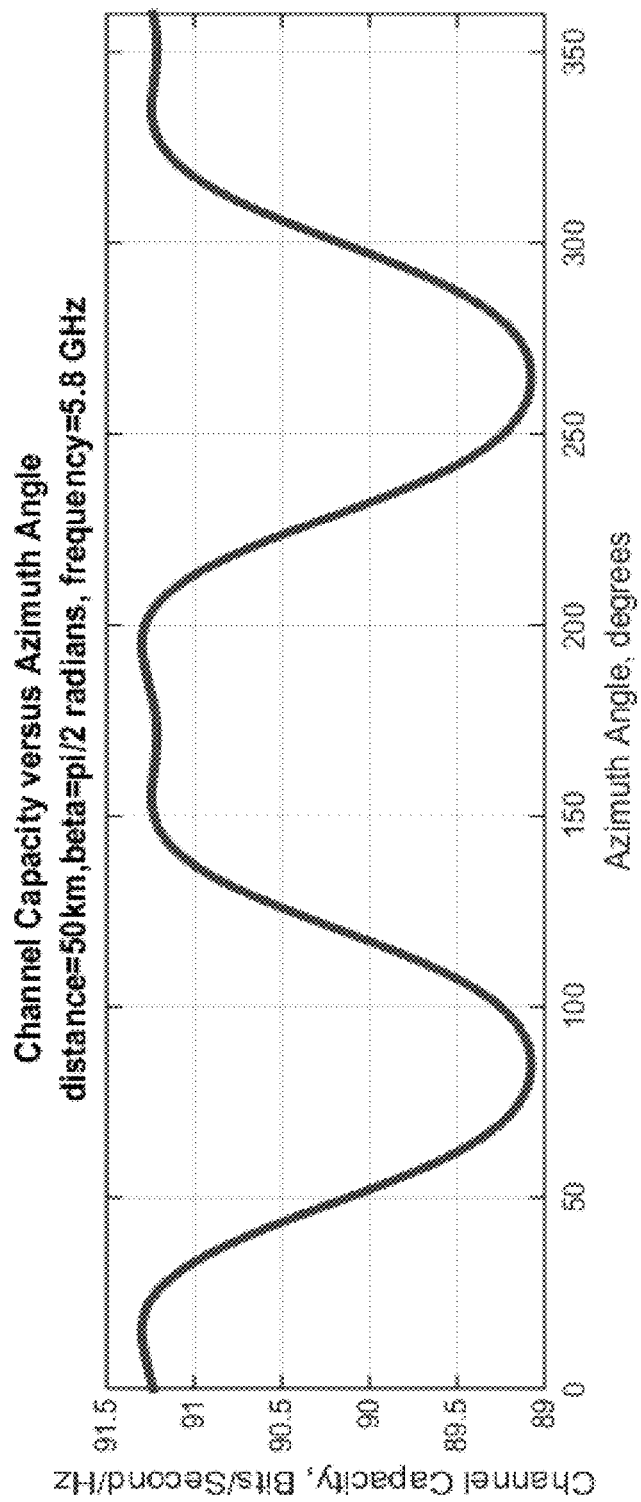
FIG. 6 depicts channel capacity versus azimuth angle for a 50 km range.
Figure 7:
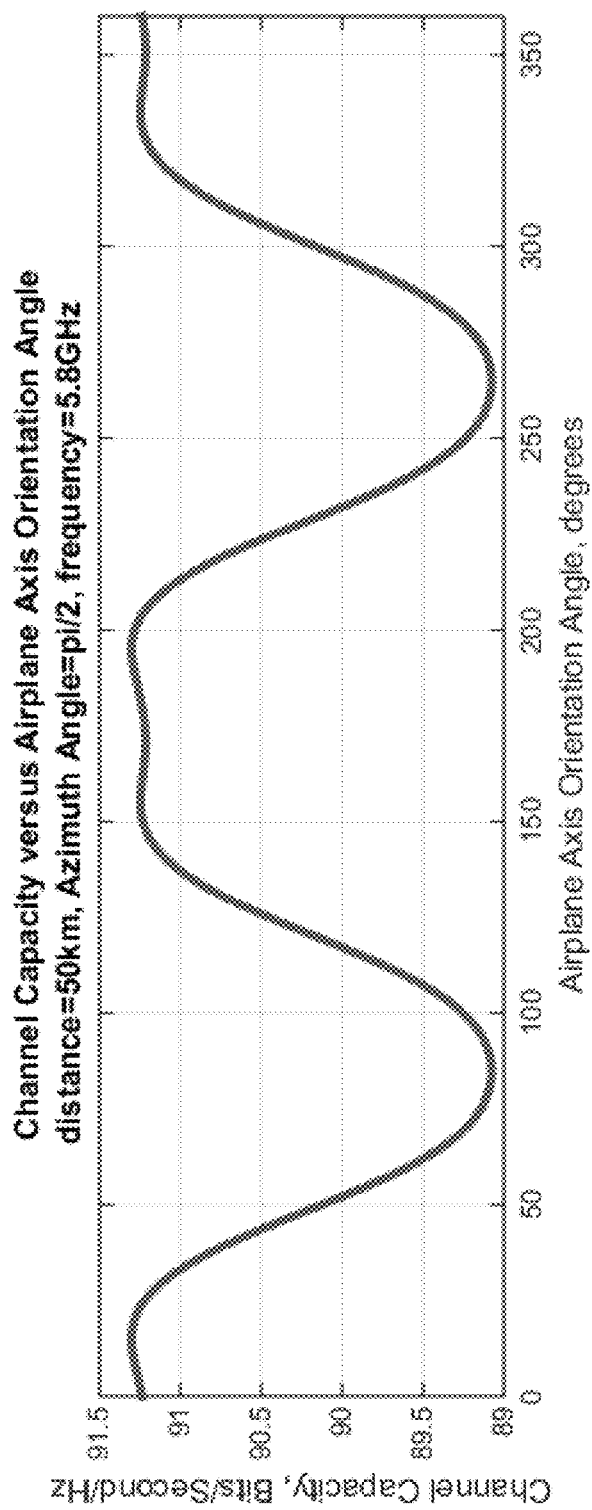
FIG. 7 depicts channel capacity versus aircraft axis orientation for a 50 km range.

Referring to FIG. 5, FIG. 6 and FIG. 7 displays the channel capacity computed, at 10 dB signal-to-noise ratio, for free-space propagation, which neglects scattering. The antenna layouts assumed in FIG. 3 and FIG. 4 are assumed.

Figure 8:
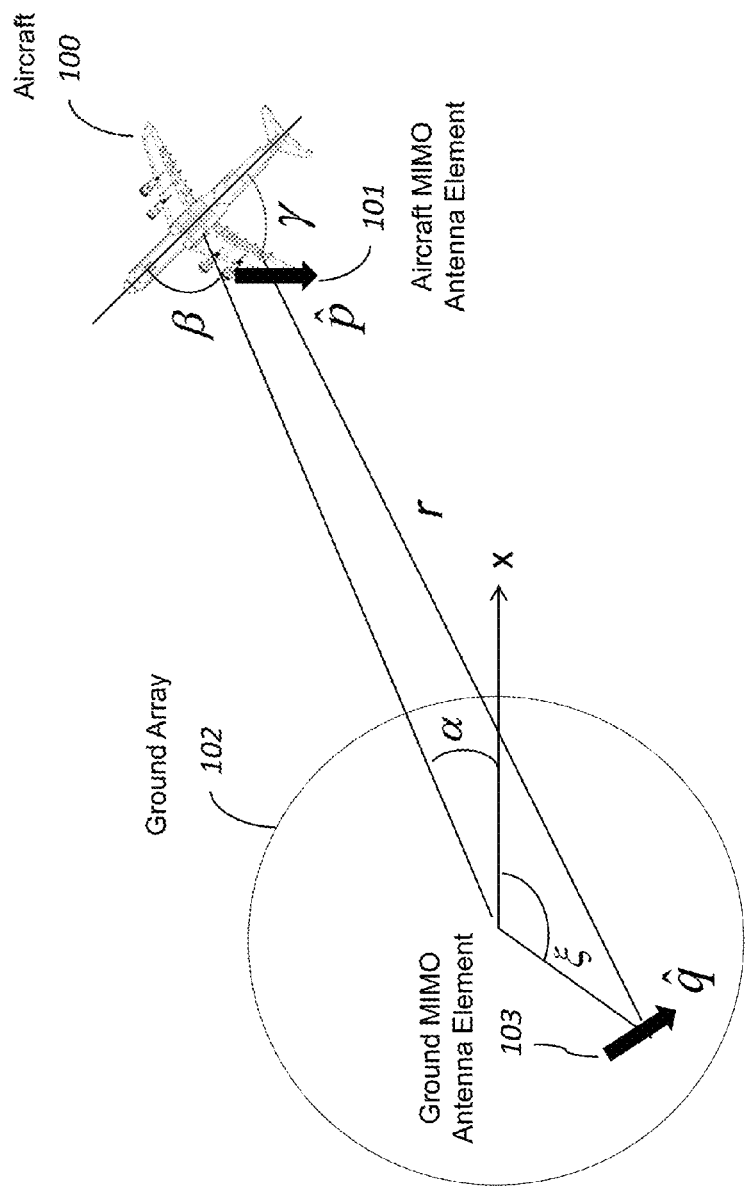
FIG. 8 depicts the components of a large aperture MIMO relay.

Referring to FIG. 8, the symmetry axis of the ground array is aligned with the $\hat{x}$ axis, and the azimuth direction of the aircraft from the line between the aircraft origin to the origin of the ground array is at an angle $\alpha$ relative to $\hat{x}$ (denoted by alpha). The symmetry axis of the aircraft is an angle of $\beta$ relative to the azimuth direction from the origin of the aircraft to the origin of the ground array (denoted by beta). The distance from the ground array center to the aircraft is d=50 km.

Referring again to FIG. 5, FIG. 6 and FIG. 7, it is evident that the channel capacity is high and stable for variations in frequency (see FIG. 5), azimuth angle (see FIG. 6), and orientation of the aircraft (see FIG. 7). The ergodic channel capacity in a Rayleigh scattering propagation channel for the same arrays on a 64 by 64 MIMO link is 174 bits/second/Hz. Thus, the ground relay can provide a major portion of full MIMO capacity even without scattering.

Referring again to FIG. 8, the key components of a Large Aperture MIMO Relay include a MIMO transceiver array on an aircraft 100, a MIMO transceiver array on the ground 102. A typical antenna element 101 of the aircraft MIMO array is shown, with polarization $\hat{p}$ (the carat represents a unit vector) at angular location $\gamma$ relative to its symmetry axis in the aircraft array. A typical antenna element 103 of the ground MIMO array is shown, with polarization $\hat{q}$ at angular location $\xi$ relative to its symmetry axis in the ground array.

The channel capacity was computed for the various antenna array layouts. Consider a short (relative to free space wavelength, $\lambda$) dipole of length h and polarization $\hat{p}$ on the aircraft and a similar dipole of polarization $\hat{q}$ in the ground array. Given the distance r between the two dipoles, the free-space propagation constant $k=2\pi/\lambda$ and the free space impedance $\eta=\sqrt{(\mu/\epsilon)}$, the transmission coefficient (open circuit received voltage divided by dipole radiating current) is [3]:

$$T_{pq} = \frac{jk\eta h^2}{4\pi} \frac{e^{-jkr}}{r} [\hat{r} \times (\hat{r} \times \hat{p})] \cdot \hat{q}$$

The matrix of all the transmission coefficients, T, can be normalized for unit average square amplitude, $H=T/\sqrt{(\text{Trace}(TT\dagger)/(M_t M_r))}$, where $\dagger$ designates transpose-conjugate matrix and the number elements in the transmitting array is $M_t$ and the number elements in the receiving array is $M_r$. H is called the channel state matrix. The MIMO channel capacity is computed from [2]:

$$C = \log_2\left[\det\left(I_M + \frac{\rho}{M}HH^\dagger\right)\right]$$

where M is the smaller of $M_t$ and $M_r$, I is the identity matrix, and ρ is the average signal-to-noise ratio.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for airborne communications, comprising:
   a ground-based multiple-input, multiple-output antenna; and
   at least one aircraft based multiple-input, multiple-output antenna;
      wherein said ground-based multiple-input, multiple-output antenna further comprises a first plurality of transceiving elements;
         wherein said first plurality of transceiving elements are substantially arranged in a plurality of concentric rings so as to provide any said concentric ring a collective polarization coverage range of substantially 0 degrees to 360 degrees; and
      wherein said aircraft based multiple-input, multiple-output antenna further comprises a second plurality of transceiving elements;
         wherein said second plurality of transceiving elements are arranged on an airframe of an aircraft so as to provide said second plurality of transceiving elements a collective polarization coverage range of substantially 0 degrees to 360 degrees;
         wherein said transceiving elements comprising said first and said second plurality of transceiving elements are equally spaced;
         wherein said transceiving elements comprising said first and said second plurality of transceiving elements are dual polarized dipole antennas; and
         wherein said transceiving elements comprising said second plurality of transceiving elements are attached to said airframe.

2. The system of claim 1, wherein the transmission coefficient between said ground-based multiple-input, multiple-output antenna and said at least one aircraft based multiple-input, multiple-output antenna is approximately:

$$T_{pq} = \frac{jk\eta h^2}{4\pi} \frac{e^{-jkr}}{r}[\hat{r}\times(\hat{r}\times\hat{p})]\cdot\hat{q}$$

where
T is the matrix of all transmission coefficients;
h is the length of dipole of said dipole antenna;
$\hat{p}$ is the polarization of said dipole antennas on said aircraft based multiple-input, multiple-output antenna;
$\hat{q}$ is the polarization of said dipole antennas in said ground based multiple-input, multiple-output antenna;
r is the distance between said dipole antennas on said aircraft based multiple-input, multiple-output antenna and dipole antennas in said ground based multiple-input, multiple-output antenna;

k is a free space propagation constant $2\pi/\lambda$;
η is the free space impedance $\sqrt{(\mu/\epsilon)}$; and
λ is the free space wavelength.

3. The system of claim 1, wherein the channel capacity between said ground-based multiple-input, multiple-output antenna and said at least one aircraft based multiple-input, multiple-output antenna is:

$$C = \log_2\left[\det\left(I_M + \frac{\rho}{M}HH^\dagger\right)\right]$$

where
C is the channel capacity;
$H=T/\sqrt{(\text{Trace}(TT\dagger)/(M_tM_r))}$ is the normalized unit square amplitude of the matrix of all transmission coefficients T;
$M_t$ is the number of transceiving elements in a transmitting antenna array;
$M_r$ is the number of transceiving elements in a receiving antenna array;
I is the identity matrix; and
ρ is the average signal-to-noise ratio.

4. A system for airborne communications relay, comprising:
   a ground-based multiple-input, multiple-output antenna; and
   at least two aircraft each having an aircraft-based multiple-input multiple-output antenna;
      wherein said ground-based multiple-input, multiple-output antenna further comprises a first plurality of transceiving elements;
         wherein said first plurality of transceiving elements are substantially arranged in a plurality of concentric rings so as to provide any said concentric ring a collective polarization coverage range of substantially 0 degrees to 360 degrees; and
      wherein each said aircraft based multiple-input, multiple-output a further comprises a second plurality of transceiving elements;
         wherein said second plurality of transceiving elements airframe of an aircraft so as to provide said second plurality of transceiving elements a collective polarization coverage range of substantially 0 degrees to 360 degrees; and
      wherein communications is relayed from said aircraft based multiple-input, multiple-output antenna of one of said at least two aircraft, through said ground-based multiple-input, multiple-output antenna to said aircraft based multiple-input, multiple-output antenna of one or more of said other at east two aircraft;
         wherein said transceiving elements comprising said first and said second plurality of transceiving elements are equally spaced;
         wherein said transceiving elements comprising said first and said second plurality of transceiving elements are dual polarized dipole antennas; and
         wherein said transceiving elements comprising said second plurality of transceiving elements are attached to said airframe.

5. The system of claim 4, wherein the transmission coefficient between said ground-based multiple-input, multiple-output antenna and said at least one aircraft based multiple-input, multiple-output antenna is approximately:

$$T_{pq} = \frac{jk\eta h^2}{4\pi} \frac{e^{-jkr}}{r} [\hat{r} \times (\hat{r} \times \hat{p})] \cdot \hat{q}$$

where

T is the matrix of all transmission coefficients;

h is the length of dipole of said dipole antenna;

$\hat{p}$ is the polarization of said dipole antennas on said aircraft based multiple-input, multiple-output antenna;

$\hat{q}$ is the polarization of said dipole antennas in said ground based multiple-input, multiple-output antenna;

r is the distance between said dipole antennas on said aircraft based multiple-input, multiple-output antenna and dipole antennas in said ground based multiple-input, multiple-output antenna;

k is a free space propagation constant $2\pi/\lambda$;

$\eta$ is the free space impedance $\sqrt{(\mu/\epsilon)}$; and $\lambda$ is the free space wavelength.

6. The system of claim 4, wherein the channel capacity between said ground-based multiple-input, multiple-output antenna and said at least one aircraft based multiple-input, multiple-output antenna is:

$$C = \log_2\left[\det\left(I_M + \frac{\rho}{M}HH^\dagger\right)\right]$$

where

C is the channel capacity;

$H = T/\sqrt{(\text{Trace}(TT\dagger)/(M_t M_r))}$ is the normalized unit square amplitude of the matrix of all transmission coefficients T;

$M_t$ is the number of transceiving elements in a transmitting antenna array;

$M_r$ is the number of transceiving elements in a receiving antenna array;

I is the identity matrix; and $\rho$ is the average signal-to-noise ratio.

\* \* \* \* \*